US009660829B2

(12) United States Patent
Lapuh et al.

(10) Patent No.: US 9,660,829 B2
(45) Date of Patent: May 23, 2017

(54) SECURE VLANS

(75) Inventors: Roger Lapuh, Thurgau (CH); Keshav Kamble, Fremont, CA (US); Zenon Kuc, San Jose, CA (US); Hesham Elbakoury, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 1286 days.

(21) Appl. No.: 12/132,680

(22) Filed: Jun. 4, 2008

(65) Prior Publication Data

US 2008/0298373 A1 Dec. 4, 2008

Related U.S. Application Data

(60) Provisional application No. 60/941,708, filed on Jun. 4, 2007.

(51) Int. Cl.
*H04L 12/28* (2006.01)
*H04L 12/46* (2006.01)
*H04L 29/06* (2006.01)

(52) U.S. Cl.
CPC .......... *H04L 12/4641* (2013.01); *H04L 63/20* (2013.01)

(58) Field of Classification Search
USPC ............... 370/375, 351, 395.3; 709/242
See application file for complete search history.

(56) References Cited

U.S. PATENT DOCUMENTS

| 6,058,429 | A  | * | 5/2000 | Ames et al. .................. 709/242 |
| 6,765,914 | B1 | * | 7/2004 | Jain et al. ................ 370/395.31 |
| 2004/0040022 | A1 | * | 2/2004 | Gautney ....................... 717/173 |
| 2006/0111111 | A1 | * | 5/2006 | Ovadia ......................... 455/439 |
| 2007/0177495 | A1 | * | 8/2007 | Ametsitsi ............... H04L 69/32 370/208 |
| 2008/0005345 | A1 | * | 1/2008 | Roberts et al. ............... 709/230 |

* cited by examiner

*Primary Examiner* — Man Phan
*Assistant Examiner* — Pamit Kaur

(57) ABSTRACT

A VLAN is implemented with a logical hub and spoke topology that obviates local switching. Member devices are connected to a hub device such as a router via intermediate devices such as Layer 2 switches that support individual IP subnets within the VLAN. The Layer 2 switch does not allow bridging, so there is no IP subnet broadcast domain. Further, the Layer 2 switch implements only a single logical broadcast uplink port which is connected to the router. The Layer 2 switch also implements only point-to-point downlink ports, i.e., to individual member devices. Consequently, all traffic is forced to flow through the router, e.g., broadcast traffic, multicast traffic and traffic of unknown destination received by the Layer 2 switch from a member device is only flooded to the router, and the router performs intra-subnet routing in addition to routing between subnets and between VLANs. The router subjects all traffic to security measures and provide services including packet inspection, firewall, policing, metering, accounting, anti-virus, marking, filtering and encryption, and thereby reduce or eliminate the drawbacks associated with local switching.

13 Claims, 4 Drawing Sheets

Router Security & Services

Packet Inspection  Firewall  Policing  Metering  Accounting  Anti-Virus  Anti-Spoofing  Marking  Filtering  Security / Encryption

SECURE VLANS

CROSS-REFERENCE TO RELATED APPLICATIONS

A claim of priority is made to U.S. Provisional Patent Application 60/941,708, filed Jun. 4, 2008, entitled SECURE VLANS, METHOD TO ENFORCE SECURITY AND SERVICES ON ANY TRAFFIC FLOW IN A VLAN, which is incorporated herein by reference.

FIELD OF THE INVENTION

This invention relates generally to the field of network communications, and more particularly to providing security and services for traffic flows in a VLAN.

BACKGROUND OF THE INVENTION

Referring to FIG. 1, a virtual local area network (VLAN) is a set of end station network devices including but not limited to servers (100), personal computers (102) and internet protocol (IP) phones (104), collectively "members," that function as if they were connected to a single network segment. The members of a VLAN are interconnected via a Layer 2 edge switch, which may be considered part of the VLAN. Further, a VLAN may include multiple Layer 2 switches (106a, 106b, 106c), each supporting a different IP subnet (107a, 107b, 107c) which may include multiple members. Typically, the members of one VLAN (108) are shielded from members of another VLAN (110) because a device such as a router (112) processes all traffic flowing between the VLANs. As a result, member devices do not unnecessarily receive traffic from other VLANs, thereby enhancing efficiency. The router (112) also provides security by subjecting traffic traveling between VLANs to security measures. As illustrated in FIG. 1, the router may also process traffic transmitted between different IP subnets of a VLAN.

Although the illustrated prior art VLAN provides protection from devices outside the VLAN, and possibly for traffic moving between IP subnets, e.g., as shown between subnet (107b) and subnet (107c), local switching of some internal traffic is a vulnerability. One example of local switching of internal traffic is the traffic between member devices on the same IP subnet, e.g., as shown on subnet (107a). For example, traffic between a member device (102a) and member device (104a) on the same IP subnet is sent via the local Layer 2 switch (106a), i.e., without traversing the router (112). As a result, that traffic is not subjected to security measures. If one of the member devices is compromised, this vulnerability may be exploited to compromise other members. Indeed, all members of the VLAN, including those on different IP subnets, may be discovered by a compromised member of a broadcast VLAN. Security between members of the VLAN could be provided by an enforcement point at the network access level, e.g., in wiring closets. However, that solution would be costly in terms of equipment, installation and maintenance. Similarly, implementation of a VLAN/IP subnet per user is not scalable and thus not practical.

Security vulnerability is not the only drawback associated with locally switched traffic within VLANs. Another result of traffic being switched locally is that destabilizing loops can be established. Such loops cause uncontrolled bi-directional Layer 2 flooding which decreases capability and efficiency. Protocols such as spanning tree are used to attempt to avoid destabilizing loops. However, such protocols are not flawless, and some loops still occur.

SUMMARY OF THE INVENTION

The present invention is predicated in-part on recognition that approximately 90% of VLAN communication is between members and servers, and that relatively little traffic flows between members, particularly between members attached to the same Layer 2 switch. As a result, efficiency and functionality are not significantly compromised by decreasing or eliminating direct member-to-member communication via the Layer 2 switch.

In accordance with one embodiment of the invention, a communications network comprises: a plurality of member devices; a hub device; and a switch device logically disposed between the member devices and the hub device, the switch having only a single logical broadcast uplink port, the uplink port being directed to the hub device, and a plurality of point-to-point downlink ports, individual ones of the downlink ports being uniquely associated with individual ones of the member devices.

In accordance with another embodiment of the invention, a method of intra-VLAN routing between a first member device and a second member device on an IP subnet supported by a switching device comprises: the first member device sending a first address resolution protocol (ARP) request associated with the second member device to the switching device; forwarding the first ARP request from the switching device to the hub device; the hub device responding to the first ARP request by sending a reply message to the first member device, the reply message indicating an address associated with the hub device; the hub device further responding to the first ARP request by generating a second ARP request and forwarding the second ARP request to the second member device, the second ARP request indicating an address associated with the hub device; and the second member device responding to the second ARP request by sending a reply message to the hub device, the reply message indicating an address associated with the second member device; whereby the hub device learns the addresses of both the first and second member devices, and the first and second member devices learn the address of the hub device, but the first and second member devices do not learn a member device address.

Advantages associated with the invention include enhanced security and services, simplicity of implementation, and enhanced network stability. Security and services are enhanced because all traffic is processed by the router, including traffic between members of the same IP subnet. Consequently, a compromised member device is less likely to compromise other member devices. Implementation is simple because basic network design practices are unchanged, e.g., the network layout need not be modified. Rather, reconfiguration in accordance with the invention can be accomplished by software upgrade. Further, IP subnet count and VLAN count is not significantly altered. Network stability is enhanced because the router will mitigate formation of loops, and thereby help eliminate the resulting uncontrolled bi-directional Layer 2 flooding.

DETAILED DESCRIPTION

Figure 1:
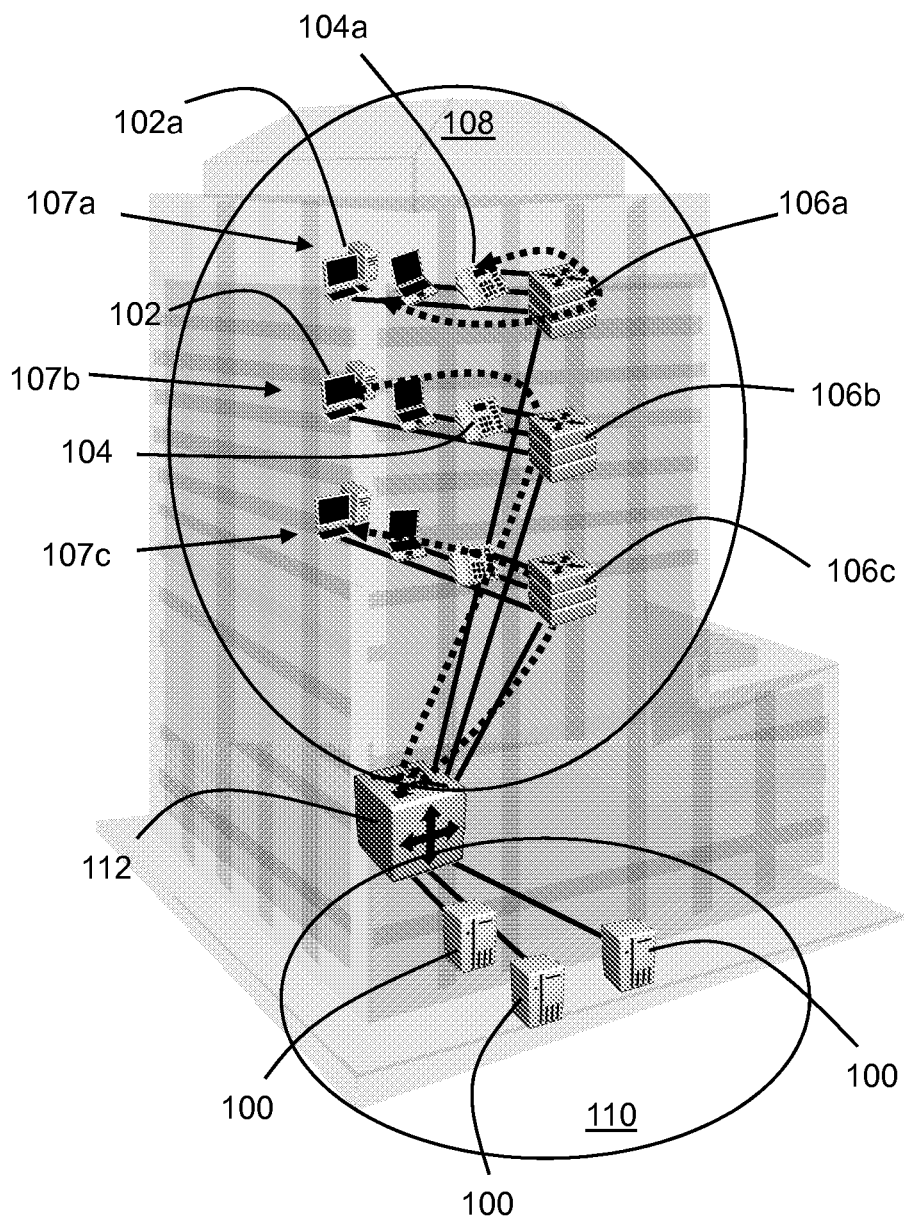
FIG. 1 illustrates a prior art VLAN.
Figure 2:
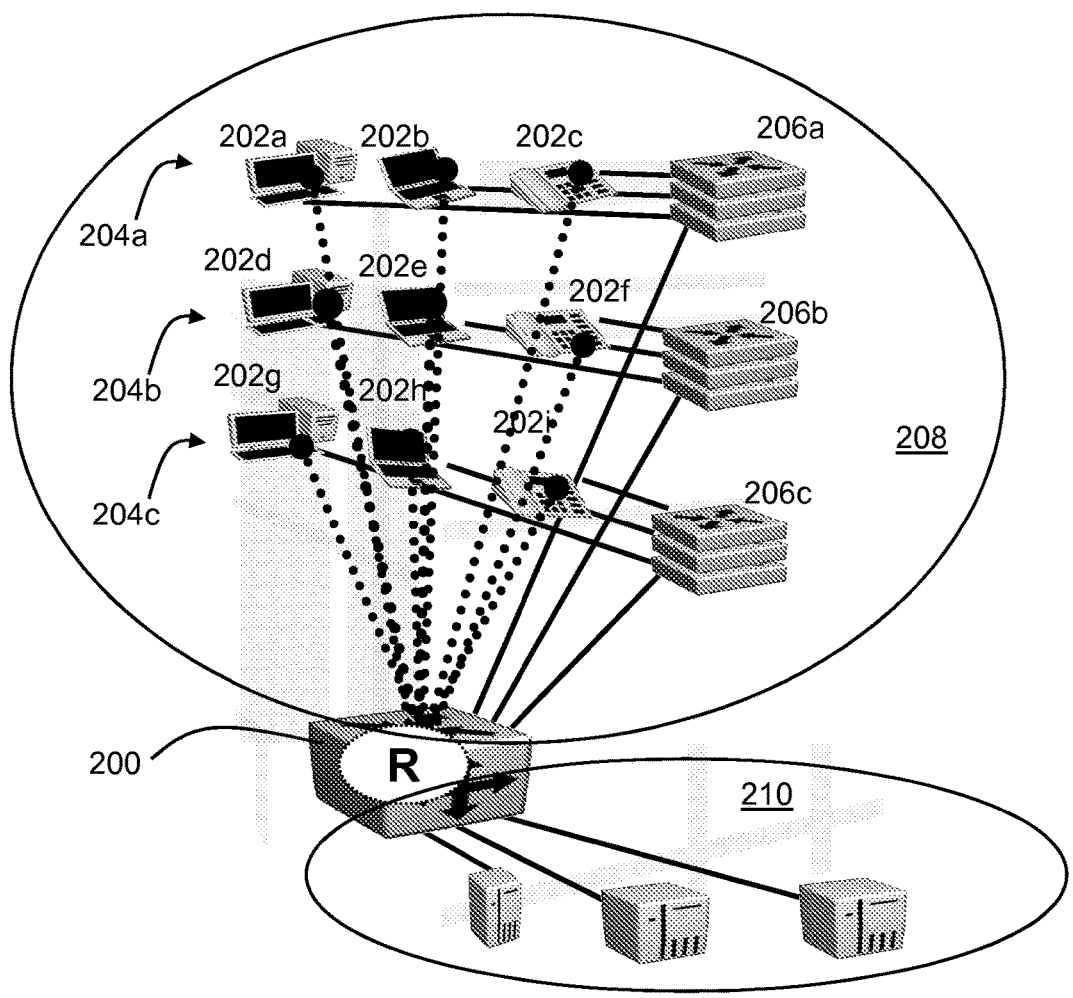
FIG. 2 illustrates a VLAN with a logical hub and spoke topology, a.k.a., star topology.
Figure 2:
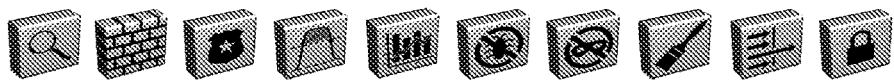

FIG. 2 illustrates a VLAN with a logical hub and spoke topology that controls or eliminates local switching within the VLAN. The physical topology is unchanged relative to prior art FIG. 1. However, unlike the prior art, all traffic is forced to flow through a hub device (200). In the illustrated embodiment the hub device (200) is a router and the member devices (202a through 202i) are disposed at the ends of the spokes relative to the router. The member device communicate with the hub device via a switch. In particular, each subnet (204a, 204b, 204c) of member devices is supported by a different switch (206a, 206b, 206c). Due to the logical hub and spoke topology, member devices can only communicate with one another via the router. In particular, the router performs intra-subnet routing in addition to routing between IP subnets and between VLANs (208, 210). Because all traffic is processed by the router, the router is able to subject all traffic to security measures and provide services including packet inspection, firewall, policing, metering, accounting, anti-virus, marking, filtering and encryption, and thereby reduce or eliminate the drawbacks associated with local switching.

Figure 3:
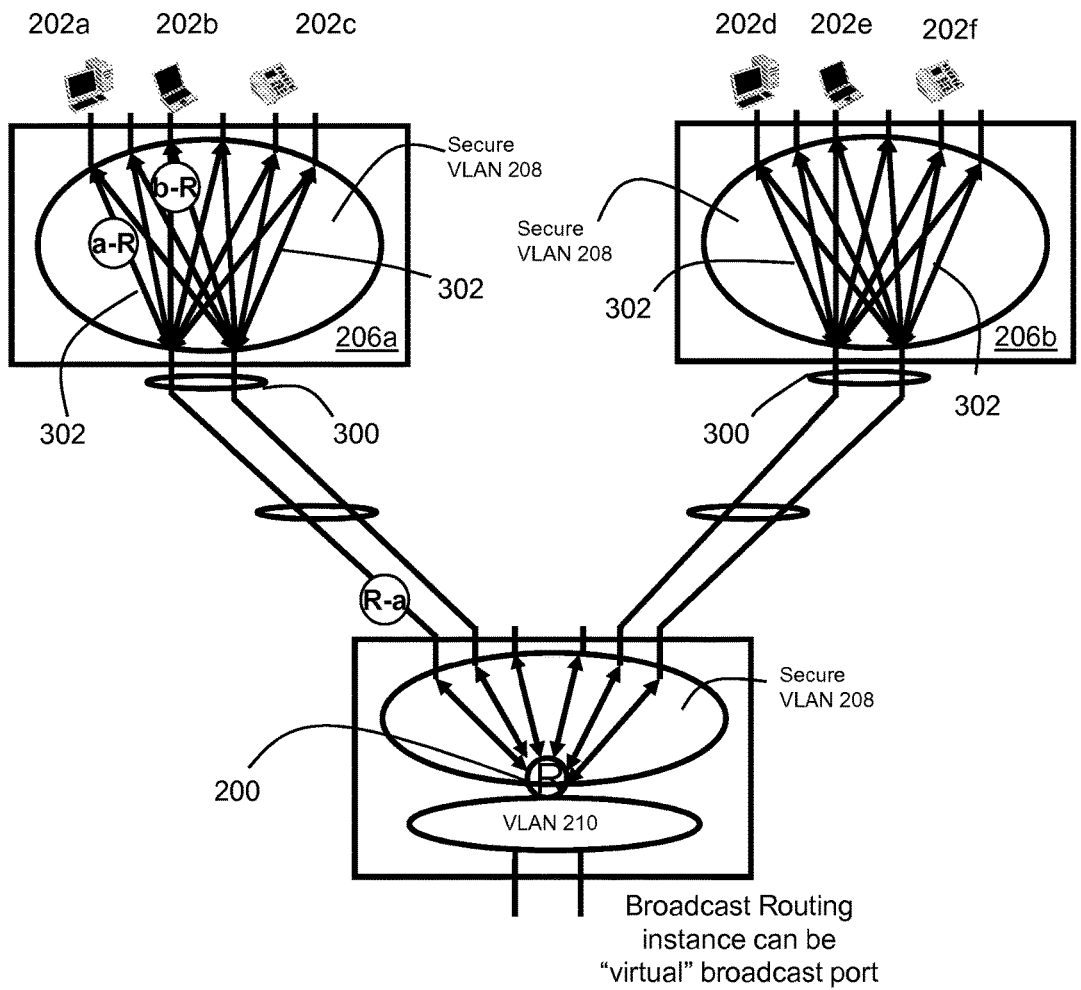
FIG. 3 illustrates intra-VLAN traffic flow in the VLAN of FIG. 2.
Figure 4:
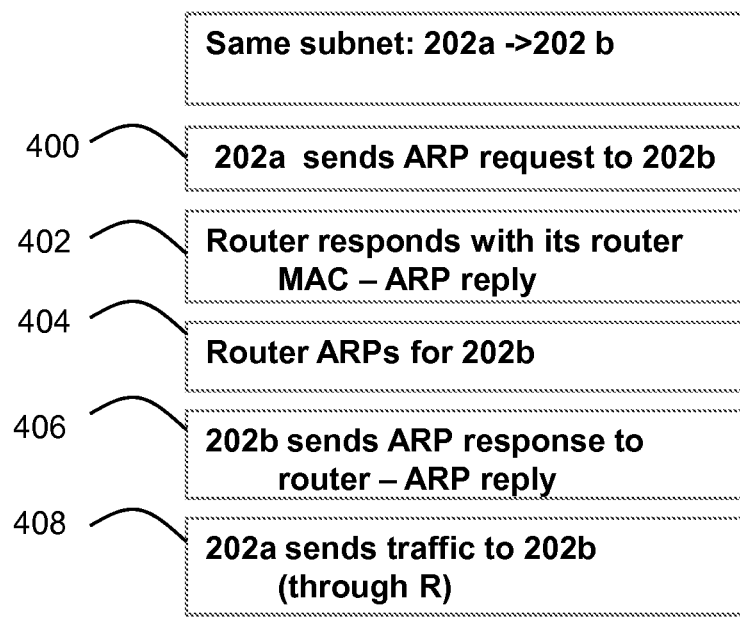
FIG. 4 is a flow diagram of the traffic flow of FIG. 3.

Referring to FIGS. 2 through 4, the logical hub and spoke topology may be enforced by any suitable mechanism. For example, switches, routers and member devices could be specifically designed so that the hub and spoke logical topology could not be circumvented. However, one of the advantages of the invention is that it may be implemented through software updates of existing devices without altering the physical topology of an installed network, and without replacing existing devices. In the illustrated embodiment the Layer 2 switches 206a, 206b, 206c) are configured or reconfigured to disable any bridging function, and thereby disable any IP subnet broadcast domain. Further, each Layer 2 switch is configured or reconfigured to implement only a single logical broadcast uplink port (300) which is connected to the router (200). Consequently, broadcast traffic, multicast traffic and traffic of unknown destination received by one of the Layer 2 switches from a member device on the same subnet is only flooded to the router, e.g., broadcast traffic from member (202a) received by switch (206a) is only flooded to the router (200). The Layer 2 switch is also configured or reconfigured to implement only point-to-point downlink ports (302), i.e., to individual member devices. Therefore, all traffic transmitted by or received by the member device is processed by the router.

FIGS. 3 and 4 illustrate an example of intra-VLAN routing on the same IP subnet in accordance with an embodiment of the invention. Intra-subnet routing is facilitated by the router (200) participating in all address resolution protocol (ARP) requests. A proxy ARP function which handles any ARP request from a device via a non-broadcast port may be utilized. In an initial step (400), member device (202a) sends an ARP request to member device (202b). Due to the configuration of the Layer 2 switch (206a), the ARP request is forwarded to the router (200), rather than broadcast to other member devices on the subnet. The router (200) replies to the ARP request with a message indicating the MAC address of the router, as indicated in step (402). Further, the router generates an ARP request which is sent to member device (202b), as indicated in step (404). Member device (202b) replies to the ARP request as indicated in step (406). At this point both member devices (202a, 202b) know the address of the router (200), but not the addresses of one another. Further, the router knows the addresses of the member devices. Member device (202a) can then send traffic to member device (202b) via the router. The router overwrites the MAC address in packets in order to "route" the traffic and maintain the address security. Note that neither member device learns the MAC address of the other member, thereby reducing vulnerability to spoofing and denial or service attacks.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method of intra-VLAN routing between a first member device and a second member device on an Internet Protocol (IP) subnet supported by a switching device comprising:

sending, by the first member device, a first address resolution protocol (ARP) request associated with the second member device to the switching device;

forwarding, by the switching device, the first ARP request to a hub device;

sending, by the hub device, in response to the first ARP request, a first reply message to the first member device, the first reply message indicating an address associated with the hub device;

generating, by the hub device, in response to the first ARP request, a second ARP request and forwarding the second ARP request to the second member device, the second ARP request indicating an address associated with the hub device;

sending, by the second member device, in response to the second ARP request, a second reply message to the hub device, the second reply message indicating an address associated with the second member device;

whereby the hub device learns the addresses of both the first and second member devices, and the first and second member devices learn the address of the hub device, but the first and second member devices do not learn a member device address.

2. The method of claim 1 further comprising sending, by the first member device, a first packet intended to reach the second member device but addressed to the hub device.

3. The method of claim 2 further comprising forwarding, by the switching device, the first packet to the hub device.

4. The method of claim 3 further comprising subjecting, by the hub device, the first packet to one or more security measures.

5. The method of claim 3 further comprising performing, by the hub device, in response to the first packet, one or more of a packet inspection service, a firewall service, a policing service, a metering service, an accounting service, an anti-virus service, a marking service, a filtering service, or an encryption service.

6. The method of claim 3 further comprising receiving, by the hub device, the first packet and overwriting the address of the hub device with the address of the second member device.

7. The method of claim 6 further comprising forwarding, by the hub device, the first packet with the overwritten address to the second member device.

8. The method of claim 7 further comprising sending, by the second member device, a second packet intended to reach the first member device but addressed to the hub device.

9. The method of claim 8 further comprising forwarding, by the switching device, the second packet to the hub device.

10. The method of claim 9 further comprising subjecting, by the hub device, the second packet to one or more security measures.

11. The method of claim 9 further comprising performing, by the hub device, in response to the second packet, one or more of a packet inspection service, a firewall service, a policing service, a metering service, an accounting service, an anti-virus service, a marking service, a filtering service, or an encryption service.

12. The method of claim 9 further comprising receiving, by the hub device, the second packet and overwriting the address of the hub device with the address of the first member device.

13. The method of claim 12 further comprising forwarding, by the hub device, the second packet with the overwritten address to the first member device.

* * * * *